United States Patent
Chen et al.

(10) Patent No.: US 7,000,124 B2
(45) Date of Patent: Feb. 14, 2006

(54) POWER MANAGEMENT DEVICE OF AN ELECTRONIC CARD

(75) Inventors: Jui Chung Chen, Kaohsiung (TW); Shih Chieh Cheng, Hsinchu (TW); Sidney Young, Hsinchu (TW)

(73) Assignees: C-One Technology Corporation, Hsin-Chu (TW); Pretec Electronics Corporation, Fremont, CA (US)

( * ) Notice: Subject to any disclaimer, the term of this patent is extended or adjusted under 35 U.S.C. 154(b) by 575 days.

(21) Appl. No.: 10/309,299

(22) Filed: Dec. 4, 2002

(65) Prior Publication Data

US 2004/0019812 A1 Jan. 29, 2004

(30) Foreign Application Priority Data

Jul. 26, 2002 (TW) ..................... 91211522 U

(51) Int. Cl.
| | |
|---|---|
| G06F 1/26 | (2006.01) |
| G06F 9/455 | (2006.01) |
| H05K 1/14 | (2006.01) |
| H01H 83/00 | (2006.01) |
| H02J 7/00 | (2006.01) |

(52) U.S. Cl. ................. 713/300; 361/737; 307/116; 703/25; 320/137

(58) Field of Classification Search ............... 713/300; 361/737
See application file for complete search history.

(56) References Cited

U.S. PATENT DOCUMENTS

| 5,451,933 A | * | 9/1995 | Stricklin et al. ............ 361/737 |
| 5,991,530 A | * | 11/1999 | Okada et al. ................. 703/25 |
| 6,300,744 B1 | * | 10/2001 | Shum ........................ 320/137 |
| 2001/0024066 A1 | * | 9/2001 | Fu et al. ...................... 307/116 |

* cited by examiner

*Primary Examiner*—Thomas Lee
*Assistant Examiner*—Stefan Stoynov
(74) *Attorney, Agent, or Firm*—Bacon & Thomas PLLC

(57) ABSTRACT

A power management device of electronic card includes a functional module, an interface bus, a bus bridge unit, a power storage unit, an external power input unit and a power control unit. The power control unit controls the bus bridge unit, the external power input unit, and the power storage unit, so as to supply the interface power from the bus interface unit to the functional module and further charge the power storage unit, directly supply the interface power from the bus interface unit to the power storage unit for charging the same, supply the external power from the external power input unit to the functional module and further charge the power storage unit, or directly supply the external power from the external power input unit to the power storage unit for charging the same.

7 Claims, 4 Drawing Sheets

POWER MANAGEMENT DEVICE OF AN ELECTRONIC CARD

BACKGROUND OF THE INVENTION

1. Field of the Invention

The present invention relates to a power management device, and more particularly, to a power management device of an electronic card.

2. Description of the Related Art

With the advance of electronic technology, the electronic devices are getting smaller, for example, notebook computers, pocket PCs, or personal digital assistants (PDAs). These small type electronic devices are portable and powerful in calculation so as to provide a great convenience to users. However, since they are compact, they are generally provided with basic circuitry, and other circuit modules, such as memory cards, modems, local area network cards, etc., are typically implemented as external electronic cards to perform the corresponding functions. In general, this electronic card has at least one functional module and an interface, such as the PCMCIA/CF interface for being inserted into the electronic device.

Conventionally, the above functional module of the electronic card is powered to operate by the power source of the interface. However, the power source on the interface is limited and thus, if the functional module is a power-consuming module, such as the GPRS module, wireless network module, or GPS module, the electronic card may not be operated due to power insufficiency. For example, the maximum current supplied by a CF interface is 75 mA under 3V and 25 degrees and 100 mA under 5V and 25 degrees, but the driving current required by GPRS (global package radio service) is as high as 300 mA.

One direct approach to resolve above problem is to add a battery to the electronic card so as to supply sufficient power to the functional module of the electronic card. Under such an architecture, it is important to properly manage the power source provided by the interface and the power of the battery for ensuring the proper operation of the functional module.

SUMMARY OF THE INVENTION

Accordingly, the primary object of the present invention is to provide a power management device of electronic card, which can effectively manage the interface power and the battery power, and the external power to supply power to the electronic card and charge the battery.

To achieve above objects, the power management device of electronic card in accordance with the present invention comprises: a functional module providing functions of a specific electronic card; an interface bus adapted to be connected to a host, wherein the host provides an interface power through the interface bus; a bus bridge unit connected between the functional module and the interface bus for converting interface formats therebetween; a power storage unit for supplying a storage power to the functional module; an external power input unit adapted to be inserted into an external power plug for selectively providing an external power to the functional module and charging the power storage unit; and a power control unit for controlling the bus bridge unit, the external power input unit, the power storage unit and the power control unit so as to selectively supply the interface power from the bus interface unit to the functional module and further charge the power storage unit, directly supply the interface power from the bus interface unit to the power storage unit for charging the same, supply the external power from the external power input unit to the functional module and further charge the power storage unit, and directly supply the external power from the external power input unit to the power storage unit for charging the same.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
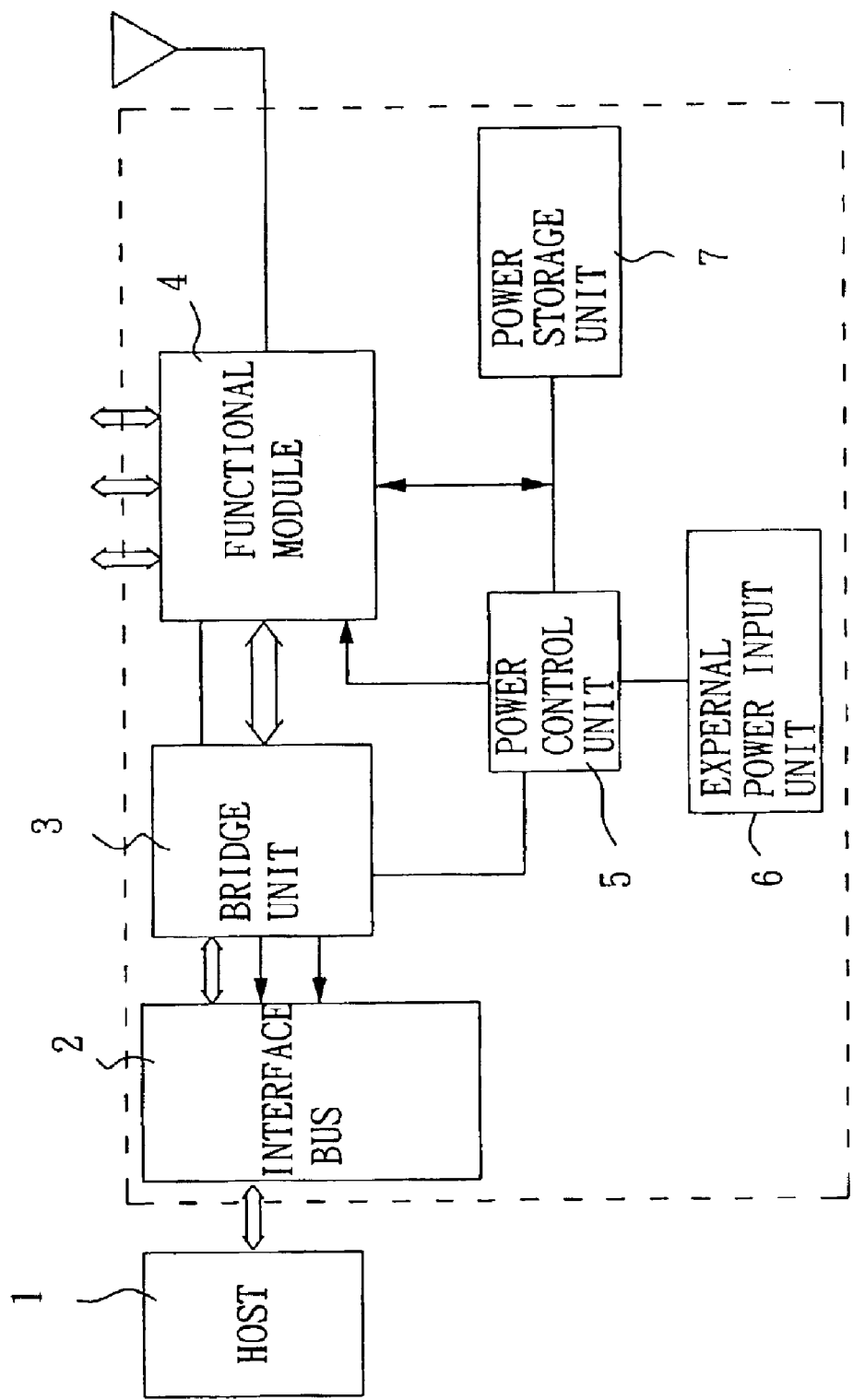
FIG. 1 is a functional block diagram of the power management device of electronic card in accordance with the present invention.

A preferred embodiment of the power management device of electronic card in accordance with the present invention will be described herein. In the following description, a personal digital assistant (PDA) with an electronic card is taken as an example. Referring to FIG. 1, a functional block diagram of the present invention is illustrated, wherein the host 1 is a PDA, and the electronic card includes an interface bus 2, a bus bridge unit 3, a functional module 4, a power control unit 5, an external power input unit 6 and a power storage unit 7.

The interface bus 2 is connected to the host 1 for use as an interface between the electronic card and the host 1. Preferably, the interface bus 2 is a CF (compact flash) interface. By the CF interface, the host 1 provides an interface power $V_{CC\text{-}CF}$. The bus bridge unit 3 is connected between the functional module 4 and the interface bus 2 for converting the interface formats between the interface bus 2 and the functional module 4. The functional module 4 provides a specific electronic card function via the bus bridge unit 3 and the interface bus 2. In this embodiment, preferably, the functional module 4 is a GPRS module, an RF module, or a global positioning system (GPS) module or other wireless communication module for providing corresponding GPRS, RF, or GPS access function. The power control unit 5 is connected to the bus bridge unit 3, functional module 4, power storage unit 7, and external power input unit 6 for controlling the bus bridge unit 3, power storage unit 7, and external power input unit 6, so as to provide power to the functional module 4. In this embodiment, preferably, the power storage unit 7 is a rechargeable battery. The power control unit 5 can control the bus bridge unit 3 and external power input unit 6 for charging the power storage unit 7 directly or indirectly.

Figure 2:
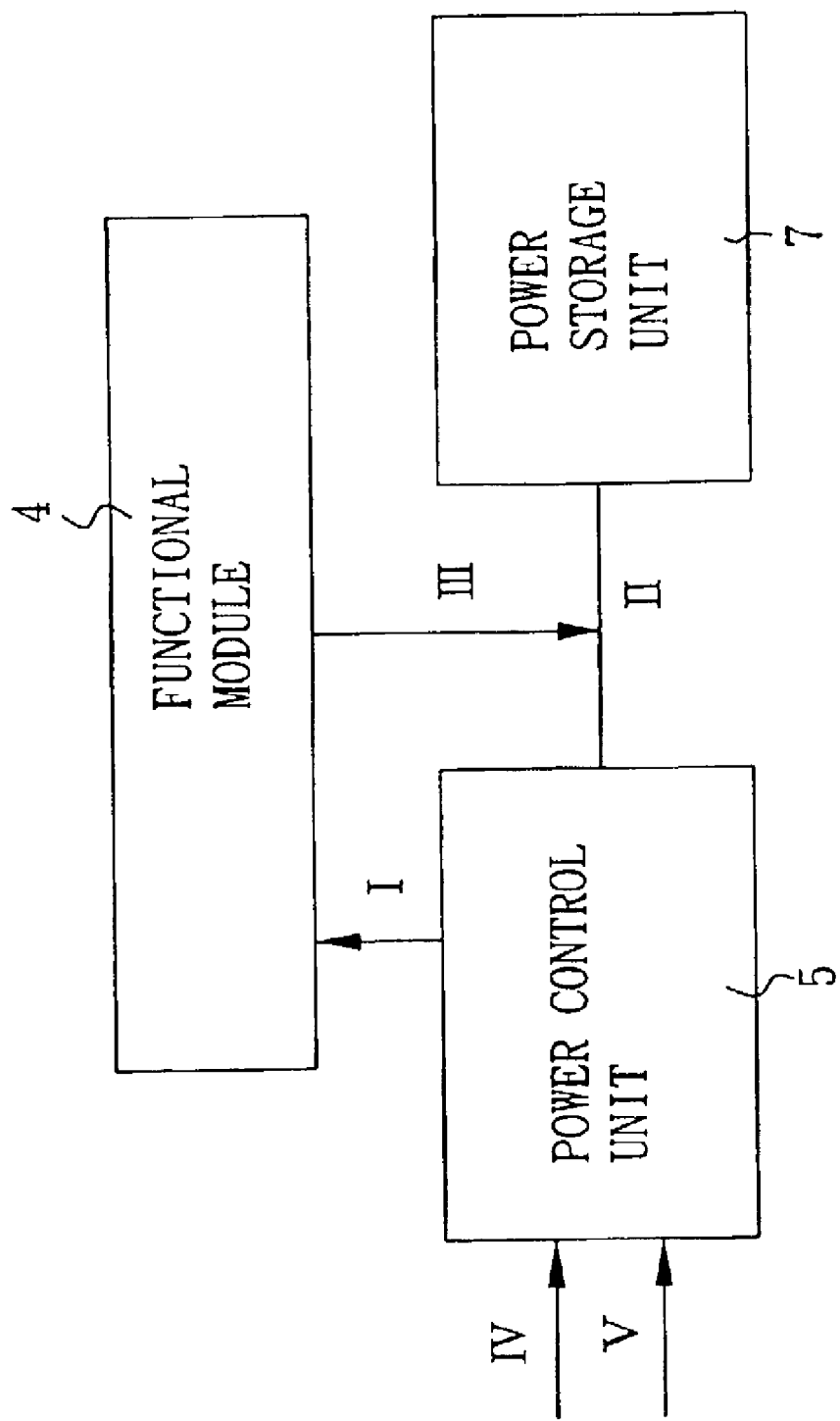
FIG. 2 is a schematic view showing the power-supplying/charging paths of the electronic card of the present invention.

FIG. 2 is a schematic view showing the power-supplying/charging paths of the functional module 4 and power storage unit 7. There are four power-supplying/charging paths. In the first power-supplying/charging path, the bus bridge unit 3 provides a driving current to the functional module 4 via the power control unit 5, and then charges the power storage unit 7 through the functional module 4 (IV→I→III→II). That is, when the driving current from the bus bridge unit 3 is sufficient to drive the functional module 4, the functional module 4 can provide a minor current to charge the power storage unit 7 slowly.

In the second power-supplying/charging path, the bus bridge unit 3 directly charges the power storage unit 7 through the power control unit 5 directly (IV→II), so that the power storage unit 7 can provide a sufficient driving current to the functional module 4.

In the third power-supplying/charging path, the external power input unit 6 inputs a driving current for supplying power to the functional module 4 via the power control unit 5, and charges the power storage unit 7 via the functional module 4 (V→I→III→II). That is, the external power input unit 6 provides a driving current to the functional module 4, and the functional module 4 provides a minor current to charge the power storage unit 7 slowly.

In the fourth power-supplying/charging path, the external power input unit 6 directly charges the power storage unit 7 through the power control unit 5 (V→II), so that the power storage unit 7 provides power to the functional module 4. In this embodiment, the external power input unit 6 is inserted into a DC Power Adapter.

Figure 3:
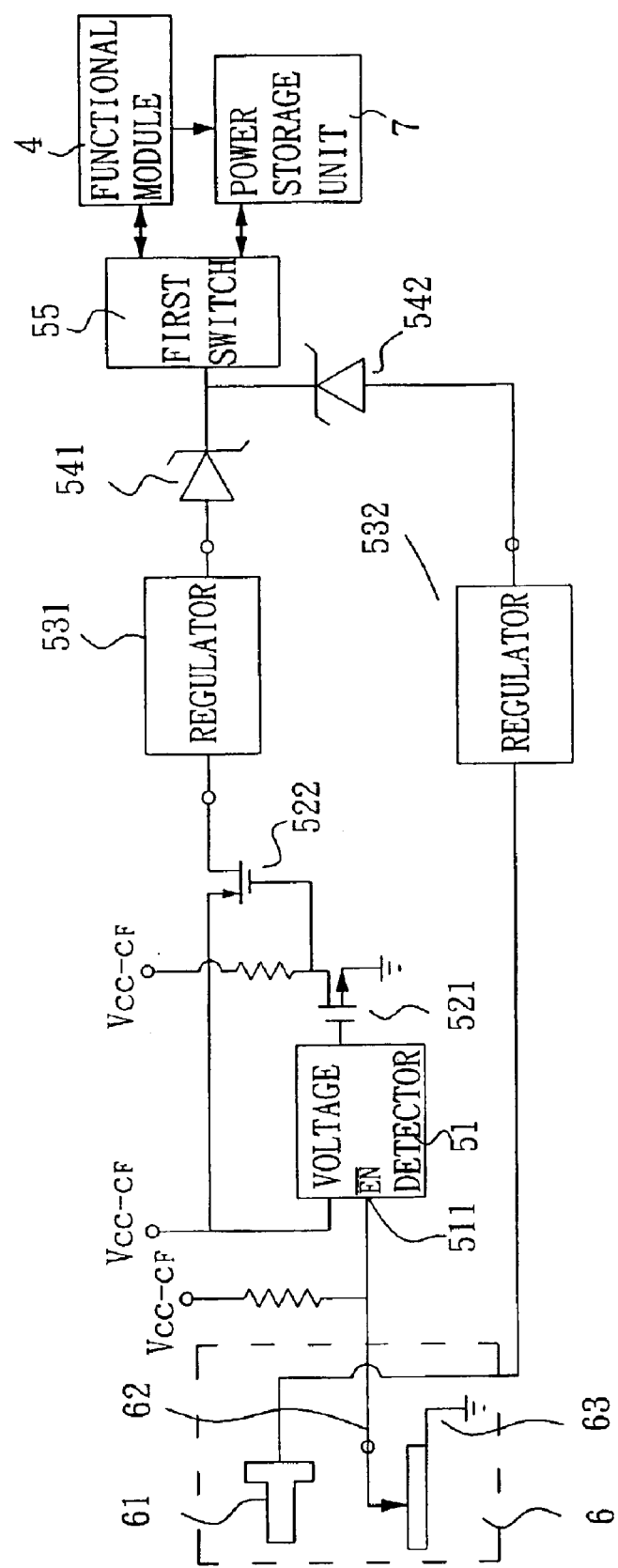
FIG. 3 is a circuit schematic view of the power management device of electronic card of the present invention.

FIG. 3 shows a circuit implementation of the power control unit 5. The power control unit 5 comprises a voltage detector 51, switching transistors 521 and 522, regulators 531 and 532, rectifying diodes 541 and 542, and a first switch 55. In this embodiment, the switching transistors 521 and 522 are preferably CMOS transistors. The rectifying diodes 541 and 542 are preferably Schottky diodes. The regulators 531 and 532 are preferably low dropout regulators (LDOs).

The external power input unit 6 has a first pin 61, a second pin 62 and a third pin 63. When the external power input unit 6 is not connected to an external power plug (not shown) (namely, no external power is inputted), the second pin 62 and third pin 63 are normally grounded. On the contrary, if the external power input unit 6 is connected to the external power plug, the second pin 62 is ejected out and is not connected to the third pin 63.

The voltage detector 51 is connected to the second pin 62 via an enable pin 511. An output of the voltage detector 51 is connected to the gate of the switching transistor 521. The drain of the switching transistor 521 is connected to the gate of the switching transistor 522. The source and drain of the switching transistor 522 is connected to the power pin $V_{CC\text{-}CF}$ provided by the bus bridge unit 3 and the regulator 531, respectively. Furthermore, the regulator 531 is connected to the first switch 55 via the rectifying diode 541. An input of the regulator 532 is connected to the first pin 61. An output of the regulator 532 is connected to the rectifying diode 542. The rectifying diode 542 is connected to the first switch 55. An output of the first switch 55 is connected to the functional module 4 and power storage unit 7, respectively. The rectifying diodes 541 and 542 are provided for rectifying and preventing the current from flowing back to other charging path.

When the external power plug is not connected to the external power input unit 6, the voltage detector 51 is enabled by a low voltage since the second pin 62 is normally grounded, and thus the switching transistors 521 and 522 are turned on. As a result, the current provided by the power pin $V_{CC\text{-}CF}$ of the bus bridge unit 3 passes through the switching transistor 521 and the regulator 531 to output a constant current for stabilizing voltage, so as to directly charge the power storage unit 7 via switching the first switch 55, or indirectly charge the power storage unit 7 through the functional module 4.

When the external power plug is connected to the external power input unit 6, the second pin 62 will be ejected out so that the voltage detector 51 is disabled by a high level voltage, and thus the switching transistors 521 and 522 are turned off. As a result, the current from the external power input unit 6 is directly applied to the regulator 532 to output a constant current for stabilizing voltage, so as to directly charge the power storage unit 7 via switching the first switch 55, or indirectly charge the power storage unit 7 through the functional module 4.

Figure 4:
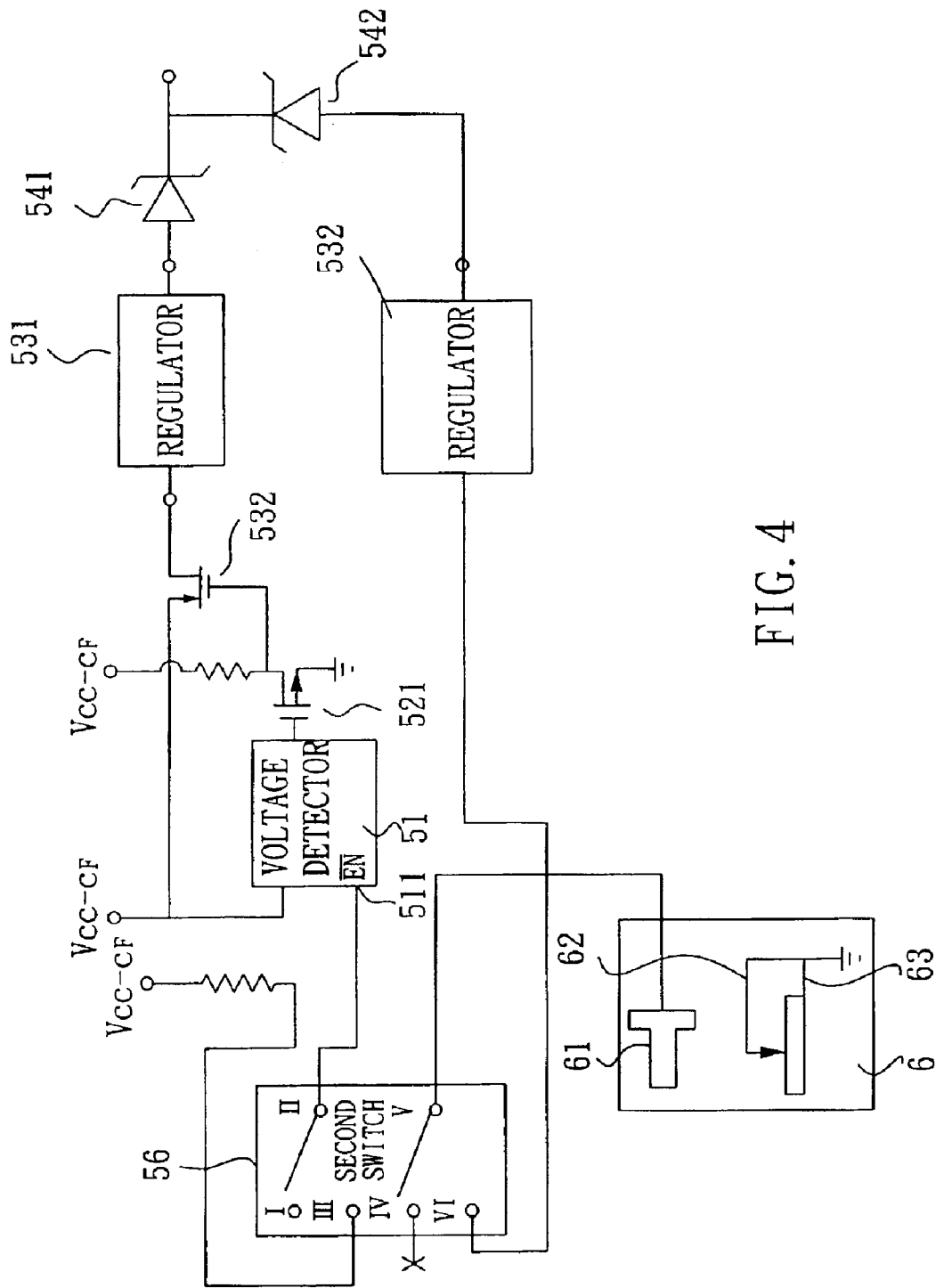
FIG. 4 is another circuit schematic view of the power management device of electronic card of the present invention.

FIG. 4 shows another circuit implementation of the power control unit according to the present invention, which is similar to the previous one shown in FIG. 3, except that an extra second switch 56 is connected to the external power input unit 6, the voltage detector 51 and the regulator 532, respectively. The second switch 56 is preferably a two-to-four switch, which provides switching conditions of (I–II, IV–V) and (II–III, V–VI), wherein the 'I' represents grounding and the 'IV' represents floating connection.

When the second switch 56 is switched to the condition of (I–II, IV–V), the voltage detector 51 is enabled by a low level voltage, so that the switching transistor 521 and 522 are turned on. Therefore, the power pin VCC-CF of the bus bridge unit 3 will supply power for charging, and the current inputted into the regulator 532 is zero. When the second switch 56 is switched to the condition of (II–III, V–VI), the voltage detector 51 is disabled by a high level voltage, so as to turn off the switching transistors 521 and 522. As a result, the external power input unit 6 will provide charging current to the regulator 532.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power management device of electronic card comprising;

a functional module providing functions of a specific electronic card;

an interface bus adapted to be connected to a host, wherein the host provides an interface power through the interface bus;

a bus bridge unit connected between the functional module and the interface bus for converting interface formats therebetween;

a power storage unit for supplying a storage power to the functional module;

an external power input unit adapted to be inserted into an external power plug for selectively providing an external power to the functional module and charging the power storage unit; and a power control unit for controlling the bus bridge unit, the external power input unit, the power storage unit and the power control unit so as to selectively supply the interface power from the bus interface unit to the functional module and further charge the power storage unit, directly supply the interface power from the bus interface unit to the power storage unit for charging the same, supply the external power from the external power input unit to the functional module and further charge the power storage unit, and directly supply the external power from the external power input unit to the power storage unit for charging the same.

2. The power management device of electronic card as claimed in claim 1, wherein the interface bus is a CF interface and the bus bridge unit is a CF bus bridge.

3. The power management device of electronic card as claimed in claim 2, wherein the power control unit comprises a voltage detector, a switching means, and a regulating means, so that when the voltage detector determines that the external power plug is not connected to the external power input unit, the switch means is turned on and the interface power provided by the bus bridge unit outputs a constant current with a steady voltage through the regulator for selectively charging the power storage unit directly and charging the power storage unit through the functional module.

4. The power management device of electronic card as claimed in claim 3, wherein when the voltage detector determines that the external power plug is connected to the external power input unit, the switch means is turned off so that the external power from the external power input unit outputs a constant current with a steady voltage through a regulator for selectively charging the power storage unit directly, and charging the power storage unit through the functional module.

5. The power management device of electronic card as claimed in claim 1, wherein the power storage unit is a rechargeable battery.

6. The power management device of electronic card as claimed in claim 1, wherein the functional module is a wireless communication module for providing GPRS, RF, GPS access functions.

7. The power management device of electronic card as claimed in claim 1, wherein the external power input unit is inserted into a DC power adaptor.

* * * * *